United States Patent [19]
Andrews

[11] 3,796,534
[45] Mar. 12, 1974

[54] GAS MANTLE RINGS

[75] Inventor: John William Andrews, Stourport on Severn, England

[73] Assignee: Steatite and Porcelain Products Limited, Stourport-on-Severn, England

[22] Filed: Nov. 6, 1972

[21] Appl. No.: 304,056

[52] U.S. Cl. ............................................... 431/112
[51] Int. Cl. ........................................... F21v 19/06
[58] Field of Search ................... 431/100, 101, 112

[56] References Cited
UNITED STATES PATENTS

| | | | |
|---|---|---|---|
| 3,649,157 | 3/1972 | Klauer | 431/100 |
| 803,835 | 11/1905 | Luhgren | 431/100 |
| 2,715,825 | 8/1955 | Zimmerman | 431/100 |

Primary Examiner—Edward G. Favors
Attorney, Agent, or Firm—Larson, Taylor & Hinds

[57] ABSTRACT

A gas mantle ring is made suitable for automatic manufacturing processes by being a fully cylindrical bush with a gas mantle groove at one end and co-planar mounting and handling features projecting from the inner and outer bush surfaces at the opposite end.

4 Claims, 4 Drawing Figures

PATENTED MAR 12 1974 3,796,534

GAS MANTLE RINGS

DESCRIPTION

A gas mantle is commonly attached to an axially-narrow ring of refractory material, the ring having an external groove for attachment of the mantle and the ring further having inwardly-projecting lugs at the ends of angularly-spaced axial projections from the ring to enable the mantle to be supported from the end of a gas supply conduit.

Such common form of gas mantle ring is hand-moulded, it not being susceptible to manufacture in automatic presses because it is fragile and is extremely liable to breakage in being removed from its mould. Also the finished rings are fragile which gives rise to difficulties in the subsequent manufacture of the gas mantles.

This invention has for an object to provide a form of gas mantle ring which is more robust, giving rise to less possibility of breakage in manufacture of the ring and subsequent manufacture of gas mantles, and which can be produced by less costly tools and in automatic presses.

According to this invention, a gas mantle ring is formed of a refractory material and comprises a fully cylindrical bush having a bore extending therethrough, the bush having adjacent one end and in its external surface a circumferential groove for attachment of the mantle and having adjacent the opposite end flanging projecting radially outwards from its external surface and in axially-spaced relation to said groove, and the bush further having projecting inwardly from the surface of its bore a plurality of angularly-spaced lugs for supporting the ring from a gas supply conduit.

Figure 1:
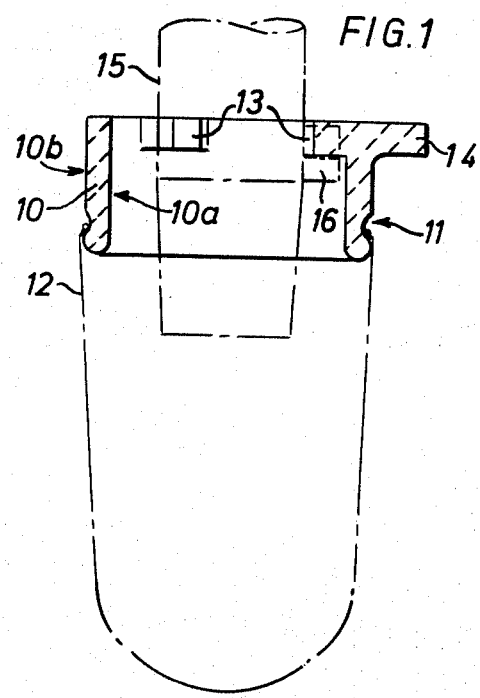
Figure 2:
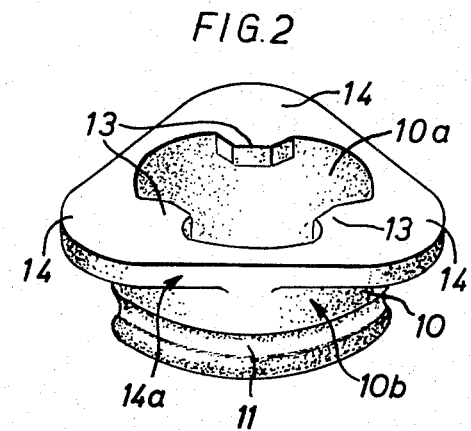
Figure 3:
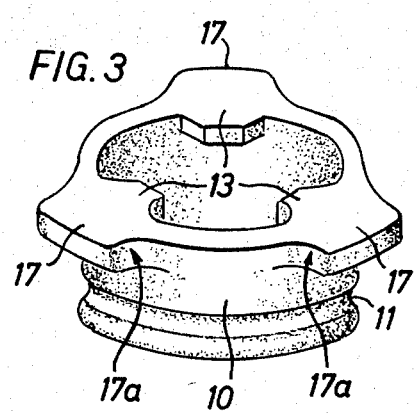
Figure 4:
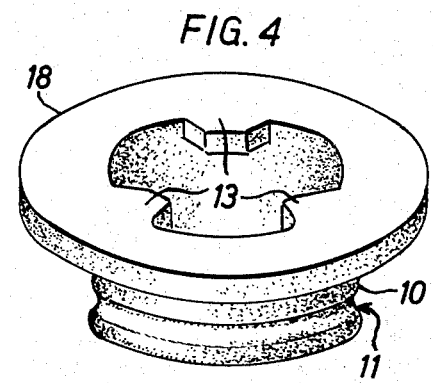

Some forms of gas mantle ring of this invention are shown on the accompanying drawings of which:

FIG. 1 is an axial section through a first form and shows the associated gas mantle and gas supply conduit in chain lines, FIG. 2 is a perspective view of the form of ring shown in FIG. 1, and FIGS. 3 and 4 are perspective views of second and third forms of ring of this invention.

Referring to FIGS. 1 and 2, the gas mantle ring shown has a main body in the form of a substantially plain cylindrical bush 10 with an external circumferential groove 11 near one end to receive the upper end of a gas mantle 12.

Spaced axially away from the groove 11 at the opposite end of the bush, there are a plurality, say three, of trapezoidal lugs 13 which project radially inwardly from the internal surface of the bush 10a these lugs being equi-angularly spaced. In radial alignment with the lugs 13 and projecting from the external surface 10b of the bush, there are three manipulating flanges 14, whereof the flanks 14a are tangential to the surface 10b.

The end surfaces of the bush 10, the lugs 13 and the flanges 14 are co-planar.

The lugs 13 enable the mantle 13 and ring 10 to be supported from the end of a gas conduit 15 by being engaged with suitable ledges 16 projecting from the conduit.

FIG. 3 shows a similar form of ring except that in this form the manipulating flanges 17 have curved flanks 17a.

FIG. 4 shows yet another form of ring which, instead of angularly-spaced manipulating flanges, has a continuous annular flange 18 the top surface of which is flush with the end of the bush 10 and the mounting lugs 13.

The forms of gas mantle ring described are substantially more robust than the commonly used form having three lugs upstanding from one end of an axially-narrow ring, and are capable of being moulded in automatic presses from a less critical starting material than is essential for hand moulding of the commonly-used type. Further the tooling required is substantially less intricate than that required for hand moulding and thus substantial economic advantages can be derived.

I claim:

1. A gas mantle ring formed of refractory material and comprising a fully cylindrical bush having a bore of uniform diameter throughout its axial length extending from one axial end of the bush to its other axial end, said bush having a main external surface of uniform diameter, the bush having adjacent the one axial end and in its external surface a shallow circumferential groove for attachment of the mantle and having adjacent the said other axial end flanging projecting radially outwards from the said external surface and in axially-spaced relation to said groove, and the bush further having adjacent said other axial end and projecting inwardly from the surface of its bore a plurality of angularly-spaced lugs for supporting the ring from a gas supply conduit, the said bush, the said flanging and the said lugs having their axially-facing outer end surfaces co-planar.

2. A gas mantle ring according to claim 1, the radially-outwardly projecting flanging being a continuous annular flange.

3. A gas mantle ring according to claim 1, the radially-outwardly projecting flanging comprising a plurality of discrete, angularly-spaced flanges radially aligned with the angularly-spaced lugs.

4. A gas mantle ring according to claim 1 wherein the cylindrical wall of said bush is of substantially uniform thickness and continuity from one axial end of the bush to the other axial end, apart from said circumferential groove and said flanging and lugs.

* * * * *